United States Patent Office 2,725,390
Patented Nov. 29, 1955

2,725,390

2-NITRO-4-SULFONAMIDO-DIPHENYLAMINE DYE COMPOUNDS

James N. Fogelman and Ronald A. Wankel, Kingsport, Tenn., assignors to Eastman Kodak Company, Rochester, N. Y., a corporation of New Jersey No Drawing. Application September 1, 1953,
Serial No. 377,974

8 Claims. (Cl. 260—397.7)

This invention relates to new 2-nitro-4-sulfonamido-diphenylamine compounds and their application to the art of dyeing or coloring.

We have discovered that the diphenylamine compounds having the general formula:

I.

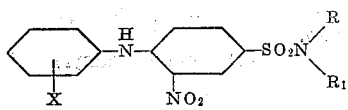

wherein R and R₁ each represents a hydrogen atom, an alkyl group having 1 to 4 carbon atoms, a hydroxyalkyl group having 1 to 4 carbon atoms, an alkoxyalkyl group having 3 to 6 carbon atoms or a monohydroxyalkoxyalkyl group having 3 to 6 carbon atoms and X represents a phenyl group are excellent yellow dyes for textile materials made of or containing a cellulose alkyl carboxylic acid ester having 2 to 4 carbon atoms in the acid groups thereof. They are especially of use for the coloration of cellulose acetate textile materials.

The new diphenylamine compounds of our invention have good affinity for cellulose acetate textile materials, exhaust well and yield yellow dyeings on said materials which have good to excellent fastness to light and gas.

It is an object of our invention to provide new diphenylamine compounds. Another object is to provide a satisfactory process for the preparation of our new diphenylamine compounds. A further object is to provide dyed cellulose alkyl carboxylic acid ester textile materials which have good fastness properties. A particular object is to provide dyed cellulose acetate textile materials which have good fastness properties.

By cellulose alkyl carboxylic acid esters having 2 to 4 carbon atoms in the acid groups thereof, we mean to include, for example, both hydrolyzed and unhydrolyzed cellulose acetate, cellulose propionate, cellulose butyrate, cellulose acetate-propionate and cellulose acetate-butyrate.

The new diphenylamine compounds of our invention are prepared by condensing a primary arylamine having the formula:

II.

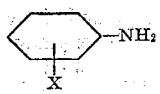

wherein X has the meaning previously assigned to it with a monocyclic benzene compound having the formula:

III.

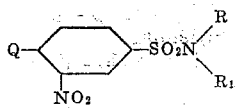

wherein R and R₁ have the meaning previously assigned to them and Q stands for a halogen atom such as a chlorine atom or a bromine atom, in the presence of an acid binding agent.

Illustrative of the alkyl groups represented by R and R₁ are the methyl, the ethyl, the n-propyl, the isopropyl and the n-butyl groups. Illustrative of the hydroxyalkyl groups represented by R and R₁ are the β-hydroxyethyl, the β-hydroxypropyl, the γ-hydroxypropyl, the β,γ-dihydroxypropyl, the β-methyl-β,γ-dihydroxypropyl and the δ-hydroxybutyl groups. Similarly, the β-methoxyethyl, the β-ethoxyethyl, the β-n-propoxyethyl, the β-n-butoxyethyl and the γ-n-propoxypropyl groups are illustrative of the alkoxyalkyl groups represented by R and R₁. Likewise the β-hydroxyethoxyethyl, the β-hydroxyethoxyethoxyethyl, the β-(β-hydroxypropoxy)-propyl and the γ-(γ-hydroxypropoxy)-propyl groups are illustrative of the monohydroxyalkoxyalkyl groups R and R₁ represent.

The member X may be an unsubstituted phenyl group or a phenyl group containing substituents such as an amino group, an alkyl group such as a methyl group or an ethyl group, or an alkoxy group such as a methoxy group or an ethoxy group, for example.

p-Aminodiphenyl, o-aminodiphenyl, m-aminodiphenyl, p-benzidine, 2'-methyl-p-aminodiphenyl, 4'-methyl-p-aminodiphenyl, 2'-ethyl-p-aminodiphenyl, 4'-ethyl-p-aminodiphenyl, 2'-methoxy-p-aminodiphenyl, 4'-methoxy-p-aminodiphenyl, 2'-ethoxy-p-aminodiphenyl, 4'-ethoxy-p-aminodiphenyl, 2'-methyl-o-aminodiphenyl, 4'-methyl-o-aminodiphenyl, 2'-methoxy-o-aminodiphenyl, 4'-methoxy-o-aminodiphenyl, 2'-ethoxy-o-aminodiphenyl, 4'-ethoxy-o-aminodiphenyl, 2'-methyl-m-aminodiphenyl, 4'-methyl-m-aminodiphenyl, 2'-methoxy-m-aminodiphenyl, and 4'-methoxy-m-aminodiphenyl, for example, are illustrative of the primary arylamines having the formula II which are used in preparing our new diphenylamine compounds.

4-chloro-3-nitrobenzenesulfonamide, N,N-dimethyl-4-chloro-3-nitrobenzenesulfonamide, N,N-diethyl-4-chloro-3-nitrobenzenesulfonamide, N,N-di-n-propyl-4-chloro-3-nitrobenzenesulfonamide, N,N-diisopropyl-4-chloro-3-nitrobenzenesulfonamide, N,N-di-n-butyl-4-chloro-3-nitrobenzenesulfonamide, N,N-di-β-hydroxyethyl-4-chloro-3-nitrobenzenesulfonamide, N,N-di-β-methoxyethyl-4-chloro-3-nitrobenzenesulfonamide, N,N-di-β-ethoxyethyl-4-chloro-3-nitrobenzenesulfonamide, N,N-di-(β-hydroxyethoxyethyl)-4-chloro-3-nitrobenzenesulfonamide, N-methyl-N-ethyl-4-chloro-3-nitrobenzenesulfonamide, N-ethyl-N-n-butyl-4-chloro-3-nitrobenzenesulfonamide, N-ethyl-N-β-methoxyethyl-4-chloro-3-nitrobenzenesulfonamide, N-methyl-4-chloro-3-nitrobenzenesulfonamide, N-ethyl-4-chloro-3-nitrobenzenesulfonamide, N-n-propyl-4-chloro-3-nitrobenzenesulfonamide, N-isopropyl-4-chloro-3-nitrobenzenesulfonamide, N-n-butyl-4-chloro-3-nitrobenzenesulfonamide, N-methyl-N-β-hydroxyethyl-4-chloro-3-nitrobenzenesulfonamide, N-ethyl-N-β-hydroxyethyl-4-chloro-3-nitrobenzenesulfonamide, N-ethyl-N-β,γ-dihydroxypropyl-4-chloro-3-nitrobenzenesulfonamide, N-n-butyl-N-β-hydroxyethyl-4-chloro-3-nitrobenzenesulfonamide, N-ethyl-N-δ-hydroxybutyl-4-chloro-3-nitrobenzenesulfonamide, N-β-hydroxyethyl-4-chloro-3-nitrobenzenesulfonamide, N-γ-hydroxypropyl-4-chloro-3-nitrobenzenesulfonamide, N-δ-hydroxybutyl-4-chloro-3-nitrobenzenesulfonamide and N-β,γ-dihydroxypropyl-4-chloro-3-nitrobenzenesulfonamide are illustrative of the monocyclic benzene compounds having the formula III which are used in preparing our new diphenylamine compounds.

As acid-binding agents the alkali metal carbonates such as sodium carbonate and potassium carbonate, for example, the alkali metal bicarbonates such as sodium bicarbonate and potassium bicarbonate, for example, and the alkaline earth carbonates such as calcium carbonate, for example, can be employed.

If desired, the dye compounds of our invention can be obtained in purer form by dissolving them in a suitable solvent and then reprecipitating them by the addition of water. We have found methyl cellosolve, methyl alcohol, ethyl alcohol, propyl alcohol, butyl alcohol and isopropyl alcohol to be very satisfactory solvents for this purpose. Thus the dye cake can be dissolved in methyl cellosolve and the dye reprecipitated in pure form by the addition of water. Any other suitable method can be used to obtain the dye compounds in pure form.

The following examples illustrate the new diphenylamine compounds of our invention and the manner in which they are prepared.

*Example 1*

236 grams of 4-chloro-3-nitrobenzenesulfonamide, 169 grams of p-aminodiphenyl, 84 grams of sodium bicarbonate and 1000 grams of water were placed in a flask equipped with a mechanical stirrer, a reflux condenser and a thermometer. The reaction mixture thus obtained was vigorously agitated, heated to a temperature of 95° C.–100° C. and maintained at this temperature for 36 hours. Following this the reaction mixture was filtered while hot and the dye cake was washed three times using 500 cc. of water each time and then dried in a 45° C. oven. 300 to 350 grams (90–95% yield) of 2-nitro-4-sulfonamido-4'-phenyl-diphenylamine having the formula:

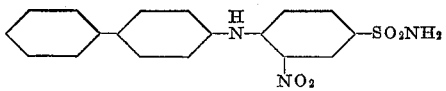

were thus obtained as a yellow solid melting above 200° C. Tests indicate that an 0.33% dyeing (pure dye) is equivalent to an 0.53% dyeing (pure dye) of the corresponding anilino derivative of 4-chloro-3-nitrobenzenesulfonamide, i. e. 2-nitro-4-sulfonamido-diphenylamine.

75 grams of the dried dye obtained as described above and 150 grams of methyl cellosolve were placed in a 500 cc. 3-necked, round-bottom, standard taper flask equipped with a stirrer, reflux condenser and thermometer. The mixture was heated, with stirring, to 115–120° C. and maintained at this temperature for one hour. The reaction mixture was then drowned in two liters of 30° C. water, stirred for five minutes, filtered and the purified dye product collected on the filter was washed five times with 80° C. water. When the dye of Example 1 is purified in this manner, the overall yield of purified dye is about 80 to 85% based on the p-aminodiphenyl. This example illustrates one manner in which the new diphenylamine dye compounds of our invention can be purified if purification is desired.

*Example 2*

By the use of 264 grams of N,N-dimethyl-4-chloro-3-nitrobenzenesulfonamide in place of the 4-chloro-3-nitrobenzenesulfonamide in Example 1, 2-nitro-4-(N,N-dimethylsulfamyl) - 4' - phenyl - diphenylamine having the formula:

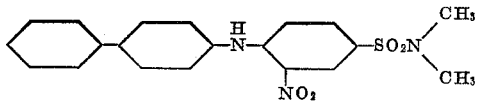

is obtained as a yellow crystalline material melting above 150° C.

*Example 3*

By the use of 169 grams of o-aminodiphenyl in place of p-aminodiphenyl in Example 1, 2-nitro-4-sulfonamido-2'-phenyldiphenylamine is obtained as a yellow solid.

*Example 4*

By the use of 184 grams of p-benzidine (p-diaminodiphenyl) in place of p-aminodiphenyl in Example 1, an 85 to 90% yield of 2-nitro-4-sulfonamido-4'-di-(p-aminophenyl)-diphenylamine was obtained as a yellow crystalline material melting above 200° C.

*Example 5*

By the use of 292 grams of N,N-diethyl-4-chloro-3-nitrobenzenesulfonamide in place of 4-chloro-3-nitrobenzenesulfonamide in Example 1, 2-nitro-4-(N,N-diethylsulfamyl)-4'-phenyl-diphenylamine is obtained as a yellow solid.

*Example 6*

By the use of 169 grams of m-aminodiphenyl in place of p-aminodiphenyl in Example 1, 2-nitro-4-sulfonamido-3'-phenyldiphenylamine is obtained as a yellow solid.

Following the procedure described more particularly in the foregoing examples, the following diphenylamine compounds of our invention are readily prepared.

7. 2 - nitro - 4 - (N,N - di - n - butylsulfamyl) - 4' - phenyl-diphenylamine
8. 2 - nitro - 4 - (N,N - di- β - hydroxyethylsulfamyl)-4'-phenyl-diphenylamine
9. 2 - nitro - 4 - (N,N - di - β - methoxyethylsulfamyl) - 4'-phenyl-diphenylamine
10. 2 - nitro - 4 - (N,N - di - β - hydroxyethoxyethylsulfamyl)-4'-phenyl-diphenylamine
11. 2 - nitro - 4 - (N - methylsulfamyl) - 4' - phenyl - diphenylamine
12. 2 - nitro - 4 - (N - ethylsulfamyl) - 4' - phenyl - diphenylamine
13. 2 - nitro - 4 - (N - isopropylsulfamyl) - 4' - phenyl - diphenylamine
14. 2 - nitro - 4 - (N - n - butylsulfamyl) - 4' - phenyl - diphenylamine
15. 2 - nitro - 4 - (N - methyl - N - ethylsulfamyl) - 4' - phenyl-diphenylamine
16. 2 - nitro - 4 - (N - ethyl - N - β - hydroxyethyl - sulfamyl) - 4' - phenyl - diphenylamine
17. 2 - nitro - 4 - (N - β - hydroxyethylsulfamyl) - 4' - phenyl-diphenylamine
18. 2 - nitro - 4 - (N - β,γ - dihydroxypropylsulfamyl - 4'-phenyl-diphenylamine
19. 2 - nitro - 4 - (N - δ - hydroxybutylsulfamyl) - 4' - phenyl-diphenylamine
20. 2 - nitro - 4 - (N - β - ethoxyethylsulfamyl) - 4' - phenyl-diphenylamine
21. 2 - nitro - 4 - (N - ethyl - N - β - methoxyethyl - sulfamyl)-4'-phenyl-diphenylamine
22. 2 - nitro - 4 - (N,N - dimethylsulfamyl) - 2' - phenyl-diphenylamine
23. 2 - nitro - 4 - (N,N - diethylsulfamyl) - 2' - phenyl - diphenylamine
24. 2 - nitro - 4 - (N - methyl - N-β - hydroxyethyl - sulfamyl-2'-phenyl-diphenylamine
25. 2 - nitro - 4 - (N,N - di - β - hydroxyethylsulfamyl) - 2'-phenyl-diphenylamine
26. 2 - nitro - 4 - (N - methyl - N - n - butylsulfamyl) - 2'-phenyl-diphenylamine
27. 2 - nitro - 4 - (N,N - dimethylsulfamyl) - 3' - phenyl - diphenylamine
28. 2 - nitro - 4 - (N,N - diethylsulfamyl) - 3' - phenyl - diphenylamine
29. 2 - nitro - 4 - (N - methyl - N - β - hydroxyethyl - sulfamyl)-3'-phenyl-diphenylamine
30. 2 - nitro - 4 - (N - methyl - N - δ - hydroxybutyl - sulfamyl)-3'-phenyldiphenylamine
31. 2 - nitro - 4 - (N - methyl - N - n - butylsulfamyl) - 3'-phenyl-diphenylamine
32. 2 - nitro - 4 - (N,N - di - β - methoxyethylsulfamyl) - 3'-phenyl-diphenylamine
33. 2 - nitro - 4 - sulfonamido - 4' - (2' - methylphenyl) - diphenylamine
34. 2 - nitro - 4 - sulfonamido - 4' - (4' - methylphenyl) - diphenylamine
35. 2 - nitro - 4 - sulfonamido - 4' - (2' - methoxyphenyl) - diphenylamine
36. 2 - nitro - 4 - sulfonamido - 4' - (4' - methoxy - phenyl)-diphenylamine 37. 2 - nitro - 4 - (N,N, - dimethylsulfamyl - 4' - (2' - methylphenyl)-diphenylamine
38. 2 - nitro - 4 - (N,N - dimethylsulfamyl) - 4' - (4' - methylphenyl)-diphenylamine
39. 2 - nitro - 4 - sulfonamido - 2' - (4 - aminophenyl) - diphenylamine
40. 2 - nitro - 4 - (N,N - dimethylsulfamyl) - 2' - (2' - methylphenyl)-diphenylamine
41. 2 - nitro - 4 - (N,N - dimethylsulfamyl) - 2' - (4' - methylphenyl)-diphenylamine
42. 2 - nitro - 4 - sulfonamido - 3' - (4 - aminophenyl) - diphenylamine
43. 2 - nitro - 4 - (N,N - dimethylsulfamyl) - 3' - (2' - ethoxyphenyl)-diphenylamine
44. 2 - nitro - 4 - (N,N - dimethylsulfamyl) - 3' - (4' - ethoxyphenyl)-diphenylamine
45. 2 - nitro - 4 - (N - β - hydroxyethoxyethoxyethylsulfamyl)-4'-phenyl-diphenylamine.
46. 2 - nitro 4 - (N - β - hydroxypropylsulfamyl) - 4'-phenyl-diphenylamine
47. 2 - nitro - 4 - (N - γ - hydroxypropylsulfamyl) - 4' - phenyl-diphenylamine
48. 2 - nitro - 4 - (N - β - methyl - β,γ - dihydroxy - propylsulfamyl)-4'-phenyl-diphenylamine The dye compounds of our invention can be applied to the textile materials named hereinbefore in the form of an aqueous dispersion and are ordinarily so applied. To illustrate, the dye compound is finely ground with a dispersing agent such as sodium lignin sulfonate, Turkey red oil, soap, or an oleyl glyceryl sulfate and the resulting mixture is dispersed in water. The dye bath thus prepared is heated to a temperature approximating 45° C.–55° C. and the textile material to be dyed is immersed in the dyebath, following which the temperature is gradually raised to 80° C.–90° C. and maintained at this temperature until dyeing is complete, usually one-half to two hours. From time to time throughout the dyeing operation, the material is worked to promote even dyeing. Upon completion of the dyeing operation, the textile material is removed from the dyebath, washed with an aqueous soap solution, rinsed well with water and dried.

Widely varying amounts of dye can be used in the dyeing operation. The amount of dye used can be, for example, ⅓ to 3% (by weight) of that of the textile material although lesser or greater amounts of dye can be employed.

We claim:
1. The compounds having the formula:

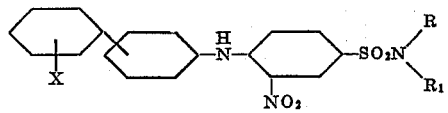

wherein R and R₁ each represents a member selected from the group consisting of a hydrogen atom, an alkyl group having 1 to 4 carbon atoms, a hydroxyalkyl group having 1 to 4 carbon atoms, an alkoxyalkyl group having 3 to 6 carbon atoms and a monohydroxyalkoxyalkyl group having 3 to 6 carbon atoms and X represents a member selected from the group consisting of a hydrogen atom, a methyl group, an ethyl group, a methoxy group, an ethoxy group and an amino group.

2. The compounds having the formula:

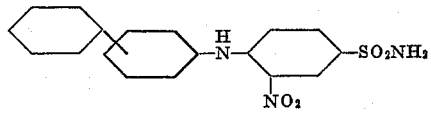

3. The compounds having the formula:

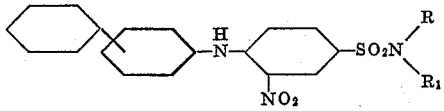

wherein R and R₁ each represents an alkyl group having 1 to 4 carbon atoms.

4. The compound having the formula:

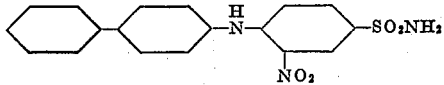

5. The compound having the formula:

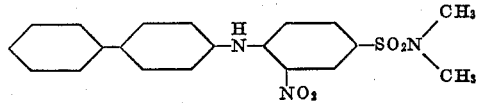

6. The compound having the formula:

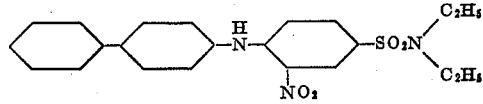

7. The compound having the formula:

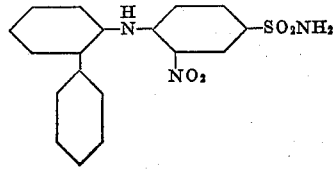

8. The compound having the formula:

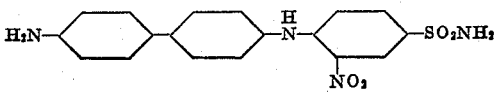

References Cited in the file of this patent
UNITED STATES PATENTS
2,466,010    Dickey et al. _____ Apr. 5, 1949
FOREIGN PATENTS
585,940    Great Britain _____ Feb. 28, 1947